June 1, 1965  J. C. HOVELAND  3,186,056
PLASTIC COMPOSITION APPLYING TOOL
Filed May 29, 1963  3 Sheets-Sheet 1
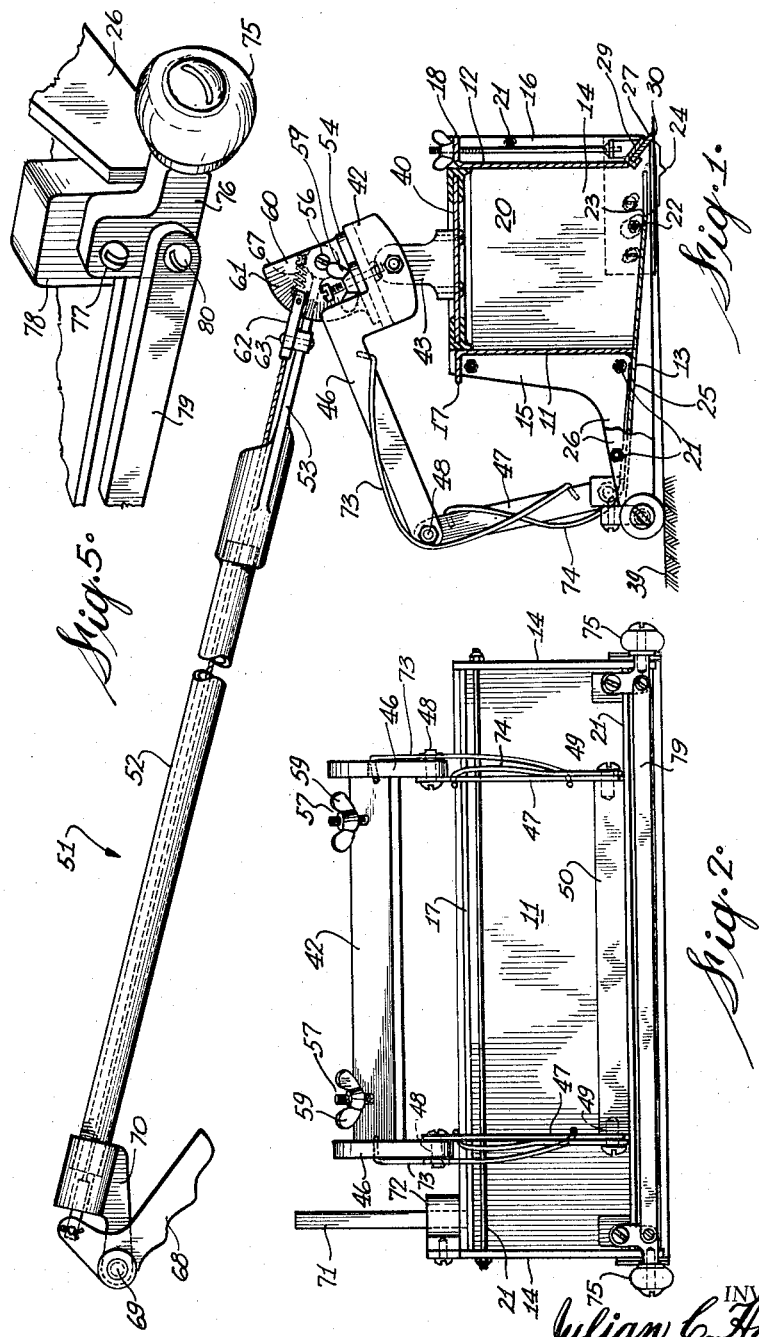
INVENTOR
Julian C. Hoveland
BY Harold A. Wein
PATENT AGENT

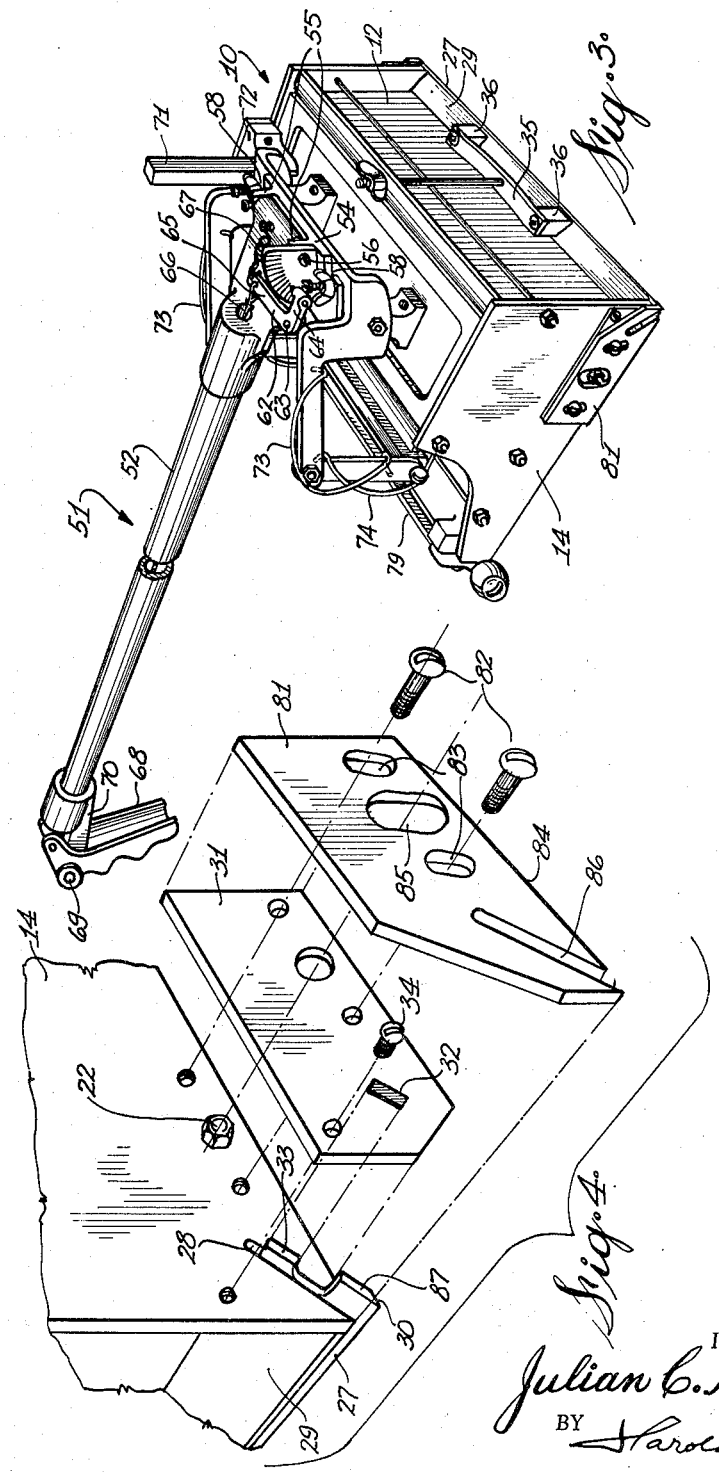

June 1, 1965  J. C. HOVELAND  3,186,056
PLASTIC COMPOSITION APPLYING TOOL
Filed May 29, 1963  3 Sheets-Sheet 3
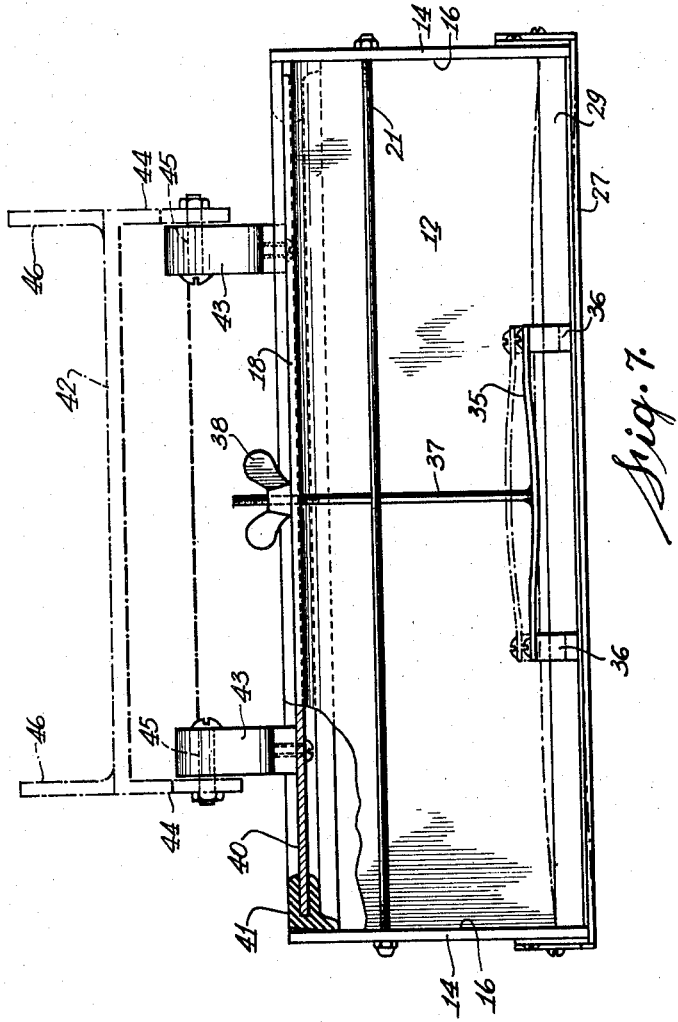
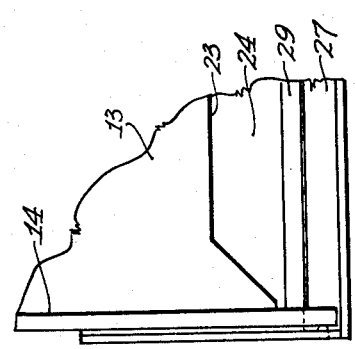
INVENTOR
Julian C. Hoveland
BY Harold Q. Weir
PATENT AGENT

United States Patent Office 3,186,056
Patented June 1, 1965

3,186,056
PLASTIC COMPOSITION APPLYING TOOL
Julian C. Hoveland, Edmonton, Alberta, Canada, assignor, by mesne assignments, to Merrill D. Muttart, Edmonton, Alberta, Canada
Filed May 29, 1963, Ser. No. 284,185
8 Claims. (Cl. 25—104.5)

This invention relates to plastic composition-applying tools.

Tools for applying plastic or moldable compositions such as plaster and the like to surfaces such as wall surfaces of wallboard and the like are in widespread use and take the form of many modifications.

It is an object of this invention to provide a plastic composition-applying tool which is of simplified and more compact structure, and which is of increased efficiency in operation.

Another object is to provide, in association with such a tool, pressure applying means of a more efficient nature.

Another object is to provide, in association with the tool, an improved mounting means for the trowelling blade thereof whereby a more effective control of the flow of plastic composition therearound is possible and a satisfactory trowelling step is performed.

Another object is to provide effective and conveniently actuatable means for adjusting the curvature of the trowelling blade.

Another object is to provide a satisfactory levelling device for the tool.

Other objects, details and advantages of the invention will become apparent from the ensuing description with particular reference to the accompanying drawings, in which FIGURE 1 is a side elevation, partly in section, of a tool in accordance with the invention, FIGURE 2 is an end elevation of the tool, FIGURE 3 is a perspective view of the tool, FIGURE 4 is an exploded perspective view of the trowelling blade and mounting means therefor, FIGURE 5 is an enlarged partial view of the levelling device, FIGURE 6 is a partial bottom plan view, and FIGURE 7 is a partial rear elevation of the tool.

In the drawing 10 is a plastic composition-receiving casing comprising a forward wall 11, a rearward or trailing wall 12, bottom wall 13, and end walls 14. The forward and rearward walls 11 and 12 are each recessed inwardly from the adjacent edges of the end walls 14 to provide forwardly projecting edge portions 15 and rearwardly projecting edge portions 16 of such end walls. As shown, also, each wall 11 and 12 has a top flange 17, 18 extending between edge portions 15 and 16. The resulting casing provides a rectangular plastic composition-receiving chamber 20 which is relatively wide between end walls 14 and relatively narrow between forward and rearward walls 11 and 12.

A plurality of bolts 21 connect the end walls 14 together and secure the casing in erected form. It will be observed that these bolts are externally of the chamber 20, i.e., they extend through the edge portions 15 and 16 whereby the interior surfaces of walls 11, 12, and 14 are substantially uninterrupted, as is the space within the chamber. A bolt 22 may, however, be provided adjacent bottom wall 13.

Bottom wall 13 is preferably slightly inclined downwardly from the forward wall 11 towards the rearward wall 12, the angle of inclination being of the order of 5° to the horizontal. Bottom wall 13 has a rearward edge 23 which is spaced forwardly from the plane of the trailing wall 12 to provide a bottom opening 24 adjoining the lower portion of such wall 12. Bottom wall 13 has a portion 25 extending forwardly beyond wall 11 between forwardly extending continuations 26 of edge portions 15. The bottom wall thus constitutes a base wall for the tool.

A trowelling blade 27 is mounted adjacent the lower edge of the trailing wall 12. The end portions of the blade project through inclined slots 28 in the end walls 14. The angle of the blade to a horizontal plane normal to the plane of the wall 12 is preferably in the order of 32° and in the range 30 to 40°, although it would be operative in the range 25° to 90°.

The blade is disposed in a channel-shaped holder 29 which extends from one to the other of the edge portions 16. The blade may be formed of spring metal and, in its unbiased condition, its lower edge 30, which is sharpened as shown, assumes a slightly convex curvature. However, the edge 30 is normally held in a planar condition by the holder 29.

Each end of the blade is rigidly supported in an end wall 14 by means of a plate 31 having a slot 32 therein for reception of an end extension 33 of the blade and secured to the end wall 14 as by means of screws 34.

It will be appreciated that the blade edge 30 constitutes the trailing edge of the bottom opening 24 through which mastic contained in the chamber 20 may be applied to an adjoining surface. For satisfactory trowelling action, the blade edge 30 may desirably form a concave curvature and means for forming such a curvature to an adjustable degree are provided. Such means, as shown, comprises a strap 35 mounted on holder 29 in spaced relation thereto as by means of a pair of spaced posts 36, and a rod 37 having one end connected to the medial portion of strap 35 and its other screw-threaded end portion extending through the overhanging flange 18 and provided with a wing nut 38. It will be apparent that, by tightening the nut 38, the rod 37 will be pulled upwardly, and the resulting upward force applied to the medial portion of the blade 27 will arch it in an upward direction. Since the blade is inherently arched in a downward direction, releasing the rod 37 will permit the blade to return to any desired arched degree. Preferably, the strap 35 is of spring metal whereby the rod 37 is continually under tension and will therefore maintain its adjusted positions.

Means for ejecting mastic or plastic composition from chamber 20 through opening 24 onto a surface, such as 39, to which the tool is applied, comprises a pressure plate 40 having a resilient strip 41 of rubber or the like mounted on its edges and adapted to snugly engage the interior surfaces of walls 11, 12 and 14. It will be apparent that, with a body of mastic in chamber 20, movement of the plate 40 in a direction normal to the surfaces of the walls 11, 12 and 14 will apply pressure to the body of mastic and eject it through opening 24. Such movement is imparted to the plate 40 by means of a bracket 42 pivotally mounted on the plate as by means of a pair of lugs 43 on the plate, a pair of flanges 44 on the bracket and a pivot pin 45 pivotally connecting each flange 44 with a lug 43. The pivotal axis of the bracket 42 with the plate is preferably disposed in a plane normal to the longitudinal axis of the plate.

Bracket 42 has a pair of forwardly extending arms 46 each of which is pivotally connected to a link 47 at 48. Each link 47 is pivotally connected at 49 to the end of a bar 50 fixed to the bottom wall portion 25.

A handle 51 comprises, a shown, a tubular section 52, and a flattened lower end section 53 to which is pivotally connected a plate 54 as by means of lugs 55 on the plate and a pivot pin 56. The handle with plate 54 is adapted to be removably mounted on bracket 42 as by means of a pair of bolts 57 receivable in slots 58 in the plate 54, and wing nuts 59.

Means for locking the handle in various desired positions against pivotal movement about its pivot 56 comprises a segment 60 fixed to and extending perpendicularly from plate 54 and having a serrated edge section 61. A bell crank lever 62 is pivoted at 63 to handle section 53 and has an arm 64 swingable into engagement with segment section 61. The lever 62 has a second arm 65 to which is connected a cable 66 which extends through the handle section 52 to the outer end thereof. A spring 67 connected to arm 65 biasses the lever in one direction of swinging movement to normally hold the arm 64 out of engagement with segment section 61.

A manually operable bell crank lever 68 is pivotally mounted at 69 to a bracket 70 mounted on the outer end of the handle section 52 and is connected to the outer end of cable 66. It will be observed that the lever 68 may be manually actuated to swing lever 62 through cable 66 and place arm 64 in pressure engagement with segment section 61.

It will be apparent that, with the handle locked against pivotal movement with respect to bracket 42, the handle will act as a lever whereby movement thereof towards the surface under treatment will cause the pressure plate 40 to move through chamber 20 to eject mastic therein.

The movement of pressure plate 40 in a direction normal to the wall surfaces of the chamber may be subject to the additional guiding effect of a post 71 extending perpendicularly from the plate 40 and a guide block 72 fixed to an end wall 14 and having surfaces slidably engaged by the post.

Further stabilization of the pressure plate movement may be provided by a spring 73 mounted on each arm 46 and urging such arm with plate 40 in a direction outwardly of the chamber 20. As shown, each spring 73 comprises a length of spring wire having one end hooked to arm 46 and its other end hooked to link 47. A stabilizing spring 74 is also mounted on each link 47 to urge the latter in a direction forwardly of the tool. As shown, this spring 74 is a length of spring wire having one end hooked to the link and its other end bearing upon the bottom wall portion 25.

In the use of the tool, it will be appreciated that uneven wall surfaces are frequently encountered and in order to maintain the wall surface-engageable surfaces of the tool in most desirable relation to the wall surface, a leveling device is preferably provided. Such device, as shown comprises a tool-supporting roller 75 at each forward corner of the tool. Each roller is journalled on a bracket 76 pivotally mounted at 77 on a block 78 fixed to the bottom wall portion 25. The two brackets 76 are connected by a link 79 pivoted at 80 to each bracket. Since the axis of the rollers 73 is thus laterally tiltable with respect to the body of the tool, irregularities in the wall surface will not unduly distort the position of the tool relatively to the wall surface.

Means are also preferably provided for conveniently compensating for wear of the trowelling blade 27. To this end each of the trailing corners of the tool has an adjustable supporting and wall surface-engageable plate 81. Each plate 81 is mounted on an end wall 14 by means of screws 82 which extend through slots 83 in the plate to permit upward or downward adjustment of the plate relative to the wall 14. It will be apparent that the lower edge 84 of the plate is adapted to ride upon the wall surface under treatment. Each plate 81 has a slot 85 therein to accommodate the head of bolt 22, and a slot 86 to accommodate the projecting end portion 87 of the blade 27. It will be apparent that, as wear of the blade occurs, the plates 81 may be moved upwardly with respect to the end walls 14 to dispose the blade edge in proper relation to the wall surface.

Moreover, since the plates 81 may always be maintained at proper level with respect to the ends of the trowelling blade, the flow of plastic therearound is subject to convient control.

I claim:
1. A plastic composition applicator which comprises a base wall, forward, rearward and end walls mounted on said base wall and forming a rectangular plastic composition-receiving chamber, said forward and rearward walls being parallel and said end walls being parallel and extending at right angles to said forward and rearward walls, said base wall being disposed at an angle of about 90° to 95° to said forward wall, said base wall having a portion constituting a bottom wall for said chamber and having a plastic composition-ejecting opening therein adjoining said rearward wall and extending from one to the other of said end walls, a trowelling blade carried by said rearward wall and having an edge extending from one to the other of said end walls and constituting an edge of said opening, a pressure plate slidably mounted in said chamber for movement in a direction normal to the interior surfaces of said chamber-forming walls, said pressure plate having a continuous edge surface in engagement throughout its extent with said interior surfaces, and means for applying pressure on said plate to move it in said direction comprising a bracket pivotally mounted on said plate about an axis in the plane of the longitudinal axis of said chamber, a pair of links pivotally mounted on said base wall exteriorly and forwardly of said chamber, an arm pivotally connecting each of said links with said bracket, a spring mounted on each said arm and urging it in a direction outwardly of said chamber, and a spring mounted on each said link and urging it in a direction forwardly of said chamber.

2. A plastic composition applicator as defined in claim 1, including a spring mounted on each said arm and urging it in a direction outwardly of said chamber, and a spring mounted on each said link and urging it in a direction forwardly of said chamber.

3. A plastic composition applicator comprising walls forming a rectangular plastic composition-receiving chamber, said walls including a pair of end walls, a bottom wall, a forward wall, and a trailing wall extending from one to the other of said end walls, said forward and trailing walls being parallel and said end walls being parallel and extending at right angles to said forward and rearward walls, said bottom wall being disposed at an angle of about 90° to 95° to said forward wall, said trailing wall having a lower edge and said botom wall having a plastic composition ejection opening adjoining such lower edge and extending from one to the other of said end walls, a trowelling blade holder mounted on said end walls adjacent said lower edge of said trailing wall, a trowelling blade carried by said holder and having an edge defining an edge of said opening, said blade edge having a substantially straight contour in the unconstrained condition thereof, means for imparting a concave contour to said blade edge comprising a rod connected to a medial section of said blade holder, a flange fixed to said trailing wall and overlying said blade holder, said rod extending through said flange, and means engaging said flange and rod for imparting axial movement to said rod, a pressure plate slidably mounted in said chamber for movement in a direction normal to the interior surfaces of said chamber-forming walls, said pressure plate having a continuous edge surface in engagement throughout its extent with said interior surfaces, and means for applying pressure to said plate to move it in said direction.

4. A plastic composition applicator as defined in claim 3, said blade being inclined at an angle of 30° to 40° to a plane normal to the plane of said trailing wall.

5. A plastic composition applicator as defined in claim 3, including a channel-shaped holder supporting said blade, a strap fixed to said holder and overlying a medial portion of said blade in spaced relation thereto, said rod being connected to said strap.

6. A plastic composition applicator as defined in claim 5, said strap being of spring metal to impart tension to said rod.

7. A plastic composition applicator as defined in claim 5, including a leveling device comprising a bracket pivotally mounted on said base wall at each forward corner thereof, a roller rotatably carried by each said bracket, and a link pivotally connecting said brackets.

8. A plastic composition applicator as defined in claim 3, including a plate fixed to each said end wall and having an edge surface located contiguous to and substantially in the plane of an end surface of said blade edge, and means for adjusting the position of each said plate on said end wall to maintain said edge surface location.

References Cited by the Examiner

UNITED STATES PATENTS

| | | | |
|---|---|---|---|
| 145,459 | 12/73 | Stevens et al. | 25—104.5 |
| 2,301,498 | 11/42 | Ames | 25—1 |
| 2,734,249 | 2/56 | Willis | 25—43 |
| 2,889,965 | 6/59 | Ames | 25—104 |
| 2,946,110 | 7/60 | Lang | 25—103 |
| 2,948,043 | 8/60 | Gory | 25—103 |

FOREIGN PATENTS 248,156   1/48   Switzerland.

MICHAEL V. BRINDISI, *Primary Examiner.*
ROBERT F. WHITE, *Examiner.*